United States Patent
Huh et al.

(10) Patent No.: US 7,085,813 B2
(45) Date of Patent: Aug. 1, 2006

(54) METHOD FOR SYNCHRONIZING REGISTRATION INFORMATION WITHIN INTRA-DOMAIN

(75) Inventors: Mi Young Huh, Daejeon (KR); Wook Hyun, Daejeon (KR); Shin Gak Kang, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 769 days.

(21) Appl. No.: 10/170,595

(22) Filed: Jun. 14, 2002

(65) Prior Publication Data

US 2003/0097456 A1    May 22, 2003

(30) Foreign Application Priority Data

Dec. 13, 2001  (KR) ................ 2001-69421

(51) Int. Cl.
*G06F 15/16* (2006.01)
(52) U.S. Cl. .............. 709/207; 709/206; 709/223; 709/238; 709/240
(58) Field of Classification Search ............ 709/204, 709/205, 216, 218, 229, 206, 223, 238, 240
See application file for complete search history.

(56) References Cited

U.S. PATENT DOCUMENTS

| 6,738,390 | B1 * | 5/2004 | Xu et al. ................ 370/467 |
| 6,842,449 | B1 * | 1/2005 | Hardjono ................ 370/352 |
| 6,885,861 | B1 * | 4/2005 | Koskelainen ............ 455/414.2 |
| 6,934,756 | B1 * | 8/2005 | Maes .................... 709/227 |

* cited by examiner

*Primary Examiner*—Ario Etienne
*Assistant Examiner*—Sargon Nano
(74) *Attorney, Agent, or Firm*—Mayer, Brown, Rowe & Maw LLP

(57) ABSTRACT

Disclosed herein is a method for synchronizing user registration information in an inter-domain. In this synchronization method, the current position information of a random user is registered through a register message when the user moves from one user agent to another. An up-sync message is transmitted upstream of a tree structure and a down-sync message is transmitted downstream of the tree structure when user registration information is created or changed. The synchronization of the user registration information is carried out in upper and lower session initiation protocol servers/registrars having received the up-sync and down-sync messages, respectively.

9 Claims, 14 Drawing Sheets

METHOD FOR SYNCHRONIZING REGISTRATION INFORMATION WITHIN INTRA-DOMAIN

FIELD OF THE INVENTION

The present invention relates generally to a user position information registration technology, and more particularly to a method for synchronizing registration information in an intra-domain, which is used to synchronize user registration information accompanying user position information registration in a distributed intra-domain.

BACKGROUND OF THE INVENTION

Currently, in accordance with IETF RFC2543 SIP standards, Session Initiation Protocol (SIP) addresses are employed to identify respective users within a single domain, and the operation processes of SIP components are described with the position information of all the users considered as being able to be known in a SIP server (proxy server, or redirect server) within the domain. That is, it is assumed that the current position information of all the users can be known in the SIP server.

There are proposed three schemes as methods of realizing the above standards. The first one is implemented in such a way that a single SIP server and a single user position information registrar are provided in a domain. The second one is implemented in such a way that a single registrar is provided at the center of a plurality of SIP servers. The third one is implemented in such a way that a plurality of SIP servers arranged in a tree structure are each provided with a registrar.

The first scheme is advantageous in that only one SIP server and only one registrar are provided, so its structure is simple and its implementation is easy. However, the first scheme is disadvantageous in that users that can be accommodated in the domain are confined to a relatively small number.

The second centralization scheme is disadvantageous in that the requests of all users are concentrated to a single registrar, so the processing speed of the entire system is decreased.

The third distribution scheme relieves the shortcomings of the first two schemes described above. The third distribution scheme tends to be applied to the most intra-domain architectures because the scheme is capable of being expanded to accommodate a relatively large number of users and the concentration of the load on a server can be prevented.

In this case, in order to register user position information in such a distributed intra-domain, the synchronization of information held by a variety of registrars must be preconditioned. In accordance with a conventional synchronization technique in the distributed intra-domain, user position information is found by means of a simple timer function. Accordingly, the conventional synchronization technique is inaccurate and inefficient. In this prior art, user registration information is stored in a database for a certain period of time, e.g., one hour, and the user registration information is cancelled after an elapse of a certain period of time, e.g., one hour. However, this prior art does not provide a reliable scheme of synchronizing user registration information.

Accordingly, there have been pursued reliable techniques of accurately and efficiently synchronizing the user registration information generated in the registrars of the distributed intra-domain.

SUMMARY OF THE INVENTION

Accordingly, the present invention has been made keeping in mind the above problems occurring in the prior art, and an object of the present invention is to provide a method for synchronizing registration information in an intra-domain, in which the current position of a user is registered and an up-sync or a down-sync message is transmitted when user registration information is created or changed, so user information can be found in all registrars regardless of which registrar the user is positioned at on the condition that the current position of the user is registered, thus providing accurate position information under SIP standards.

In order to accomplish the above object, the present invention provides a method for synchronizing user registration information in an inter-domain having UAs corresponding to the leaf nodes of a tree structure and functioning as entities for substituting for users, and SIP servers/registrars corresponding to the root node or intermediate nodes of the tree structure, comprising the steps of: registering current position information of a random user through a register message when the user moves from one UA to another; transmitting a up-sync message upstream of a tree structure and a down-sync message downstream of the tree structure when user registration information is created or changed; and performing the synchronization of the user registration information in upper and lower SIP servers/registrars having received the up-sync and down-sync messages, respectively

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENTS

Figure 1:
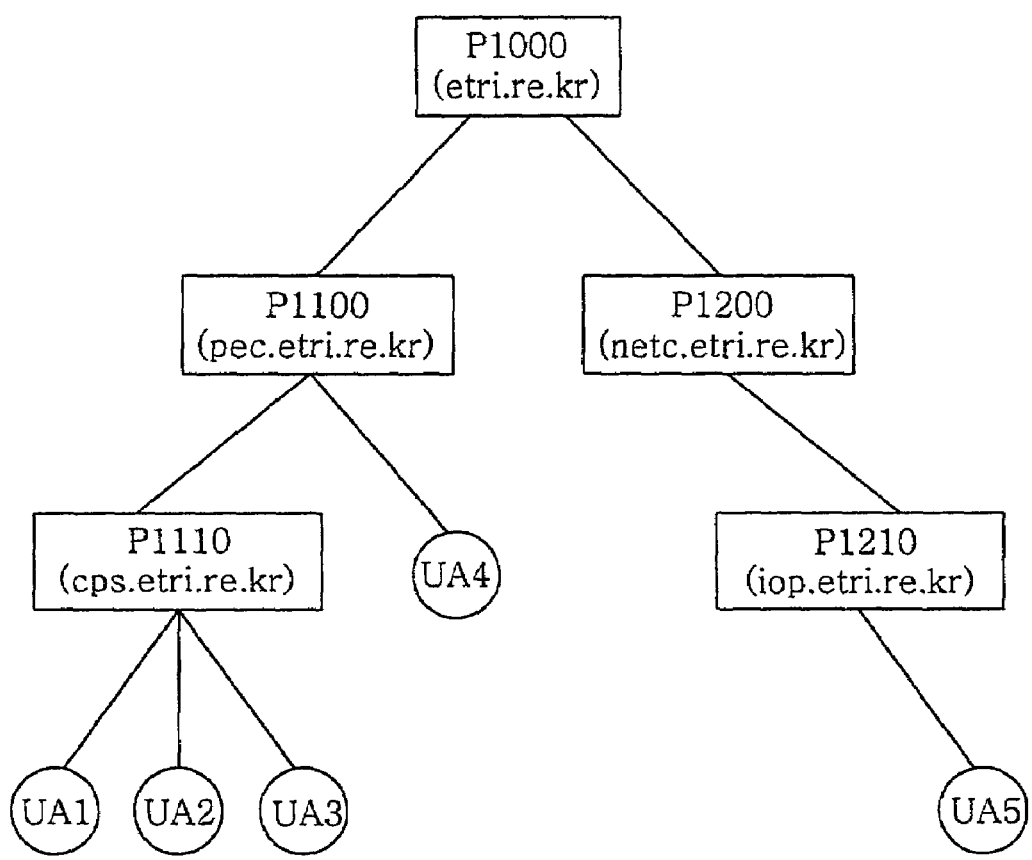
FIG. 1 is a diagram showing the tree structure of UAs, servers and registrars in the intra-domain to which a method for synchronizing registration information in accordance with the present invention is applied.

Hereinafter, a method for synchronizing user registration information in an intra-domain in accordance with a preferred embodiment of the present invention is described with reference to the accompanying drawings.

A SIP domain, to which the synchronization method of the present invention can be applied, can be defined as follows:

A SIP domain unit is a region in which a registrar capable of independently providing to users unique SIP addresses accessed by others is situated.

An implementation environment, in which user position registration information and the user information of various registrars are synchronized, is comprised of User Agents (UAs) corresponding to the leaf nodes of a tree structure and functioning as entities for substituting for users, and SIP servers/registrars corresponding to the root or intermediate nodes of the tree structure. The synchronization method is comprised of the steps of registering the current position of a user when the user is moving, transmitting an up-sync message upstream of a tree structure and a down-sync message downstream of the tree structure when user registration information is created or changed, and processing the up-sync and down-sync messages when receiving the messages.

The gist of the present invention is that the current position of a user can be easily found even though current user position information according to SIP addresses used to distinguish one user from another in a domain is stored in registrars included in SIP servers without being stored in a central server, and the concentration of load on a server can be prevented to increase the processing speed of a system in such a way that a large number of users are distributed but are not managed by the central server, thereby overcoming a shortcoming of current SIP standards that accurate position information is not provided.

In addition, the method of the present invention requires the following preconditions.

First, a tree structure connecting registrars in SIP servers is generated.

Although it is assumed that each of SIP servers accompanies a registrar for managing user registration information, a SIP server without a registrar can be present. In this case, the registrar of an upper SIP server is used as the node of a concentration structure. In this invention, the tree structure is constructed using only SIP servers with registrars.

Second, an information registration table in the registrar of each SIP server is comprised of contact addresses corresponding to "To" addresses.

In this case, the "To" addresses are the representative SIP addresses of users, and the contact addresses are addresses representing the current positions of users. User information stored in the registrar situated in a lower SIP server is allocated a corresponding SIP server/registrar address, and the address is allocated a domain or an IP address.

Third, up-sync and down-sync messages are constructed as follows:

UP-SYNC MESSAGE: The up-sync message is comprised of a "To" address corresponding to a key value for synchronization and a server address for the current address of a user. The up-sync message is transmitted in the direction of the root node of a tree structure.

DOWN-SYNC MESSAGE: The down-sync message is comprised of a "To" address corresponding to a key value for synchronization, and is transmitted in the direction of the leaf node of a tree structure.

FIG. 1 is a diagram showing the tree structure of UAs, servers and registrars in the intra-domain to which the registration information synchronization method of the present invention is applied.

As shown in FIG. 1, the tree structure of the present invention is comprised of a plurality of UAs (UA1, UA2, UA3, UA4 and UA5) corresponding to the leaves of the tree structure and functioning as entities for substituting for users, SIP servers and registrars P1000, P1100, P1110, P1200 and P1210 corresponding to the root or intermediate nodes of the tree structure.

On the basis of the above-described structure, the registration information synchronization procedure in the inter-domain in accordance with the present invention is described in detail with reference to the flowcharts of FIGS. 2A to 2D.

Figure 2A:
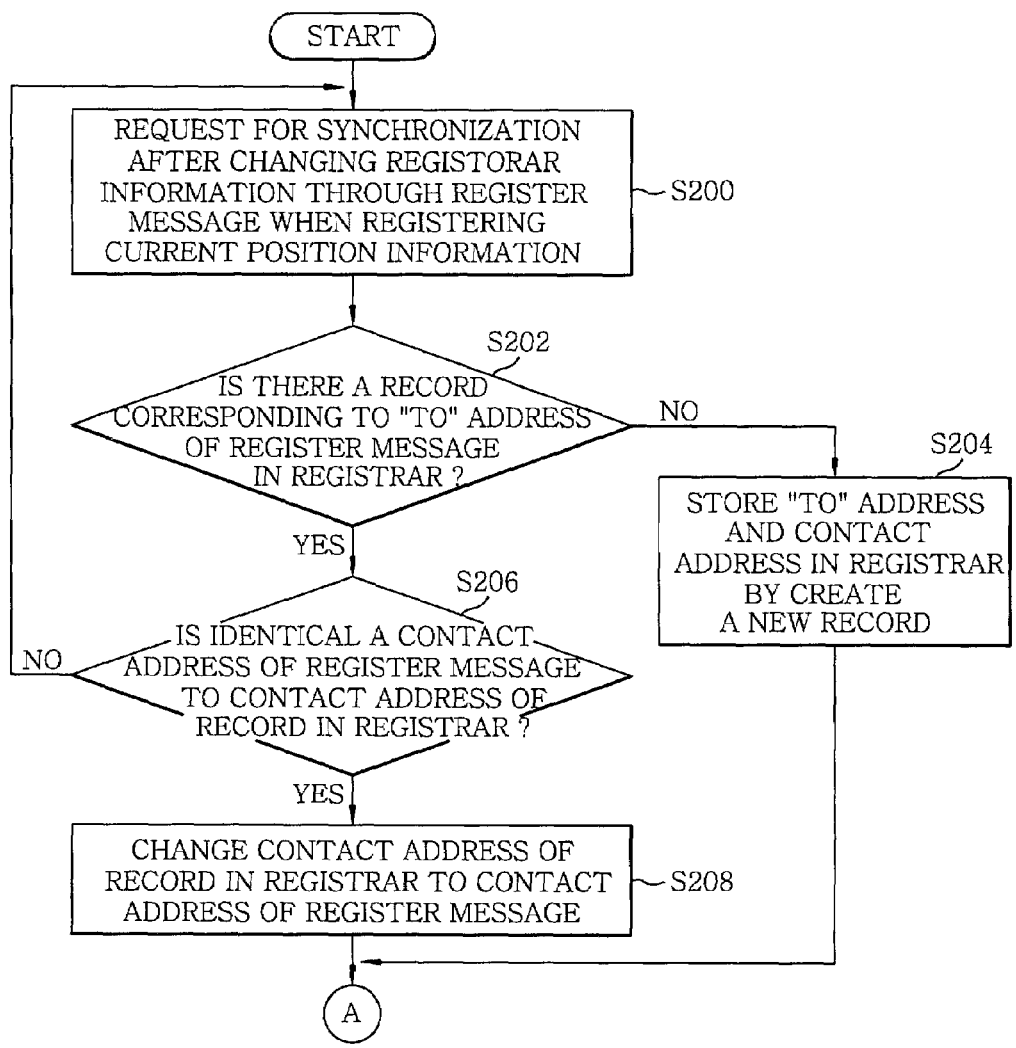
FIGS. 2A to 2D are main flowcharts showing the registration information synchronization method of the present invention.
Figure 2B:
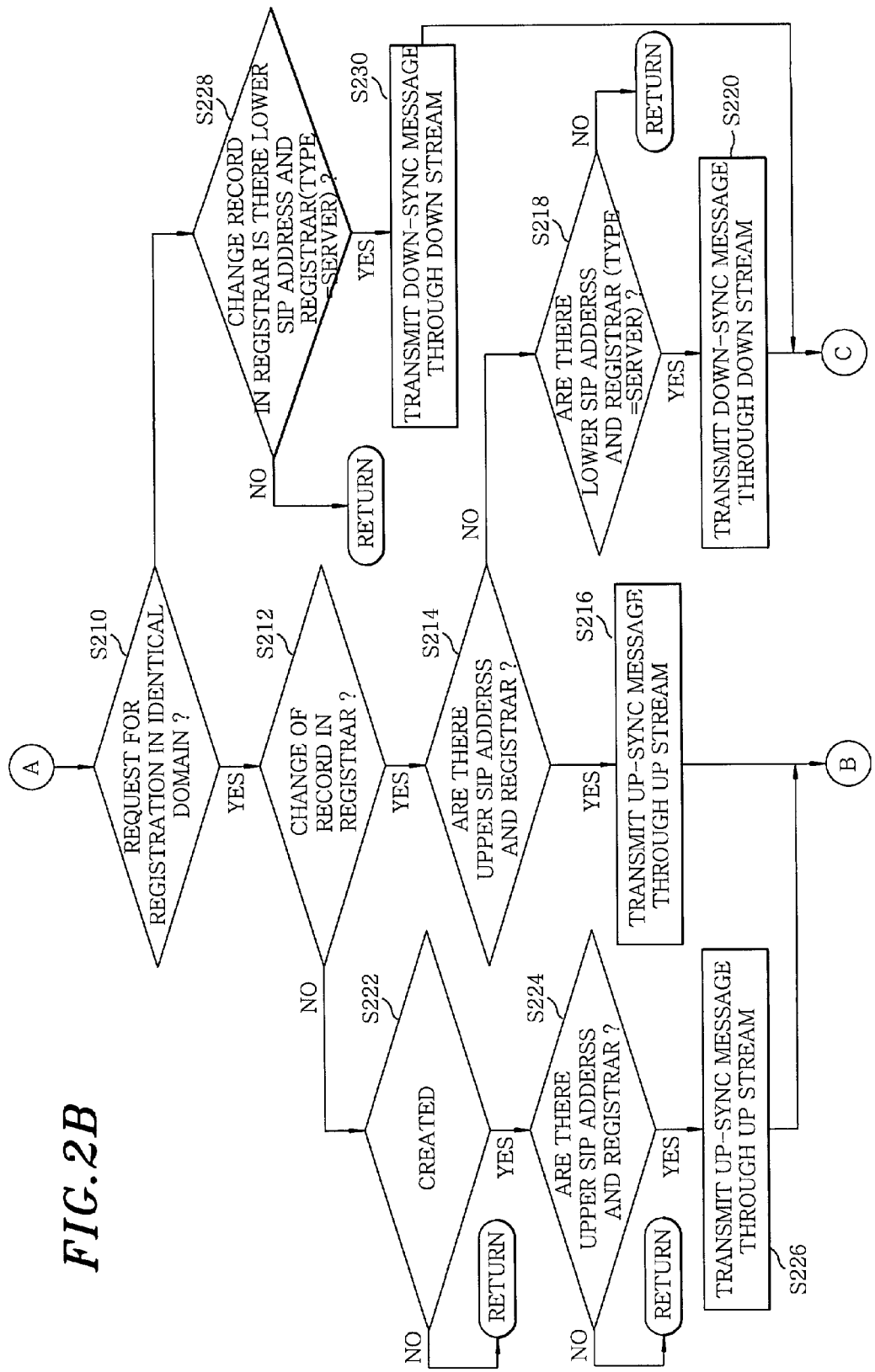

First of all, at step S200 of FIG. 2A, whenever a user registers current position information through a register message, registrar information is changed and then synchronization is carried out. Thereafter, the procedure proceeds to step S202.

At step S202, the SIP server having received the register message performs the following operation according to a record corresponding to the "To" address of the register message.

First, the "To" address of the register message is compared with the "To" address of the registrar. If a record corresponding to the "To" address of the register message is not found, the procedure proceeds to step S204.

At step S204, a new record is created and the "To" address and contact address in the register message are stored in the record.

Meanwhile, as the result of the determination of the step S202, if a record corresponding to the "To" address of the register message is found in the registrar and the contact address in the registrar is identical to the contact address in the register message, no operation is carried out.

However, if a record corresponding to the "To" address of the register message is found in the registrar but the contact address in the registrar is not identical to the contact address in the register message (S206), the procedure proceeds to step S208, where the contact address in the registrar is changed to the contact address in the register message.

Hereafter, a procedure of creating or changing a record corresponding to the "To" address of the register message is described.

First, at step S210, it is determined whether register is requested from the same domain. If register is requested from the same domain, the procedure proceeds to step S212 or S222, where it is determined whether a record corresponding to the "To" address of the register message is created or changed.

In the case where the record corresponding to the "To" address of the register message is created or changed, if an upper SIP address and an upper registrar is present (S214 and S224), the procedure proceeds to steps S216 and S226, where an up-sync message is transmitted upstream to request the addition of newly created information or the change of information to the latest information.

However, in the case where the record corresponding to the "To" address of the register message is changed as the result of the determination of the step S212 and S214, if an upper SIP address and an upper registrar is present and their type is a server, the procedure proceeds to step S220, where the down-sync message is transmitted downstream to request the deletion of information due to the change of previous information.

Meanwhile, as the result of the determination of step S210, if register is requested from a different domain, the procedure proceeds to step S228, where a record corresponding to the "To" address of the register message is changed and it is determined whether a lower SIP address, a registrar are present and their type is a server.

If these conditions are satisfied, the procedure proceeds to step S230, where a down-sync message is transmitted downstream to request the deletion of information due to the change of previous information.

Figure 2C:
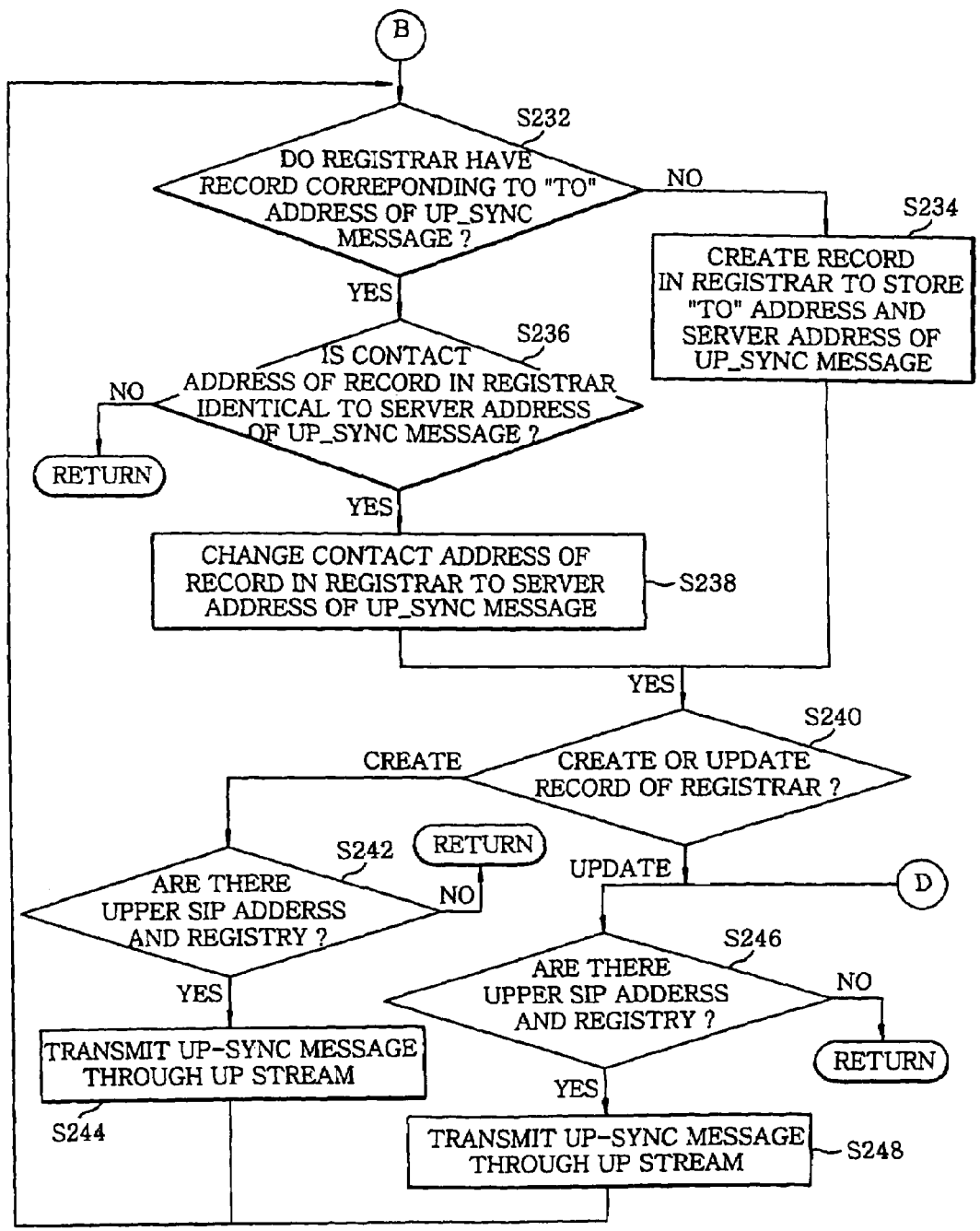
Figure 2D:
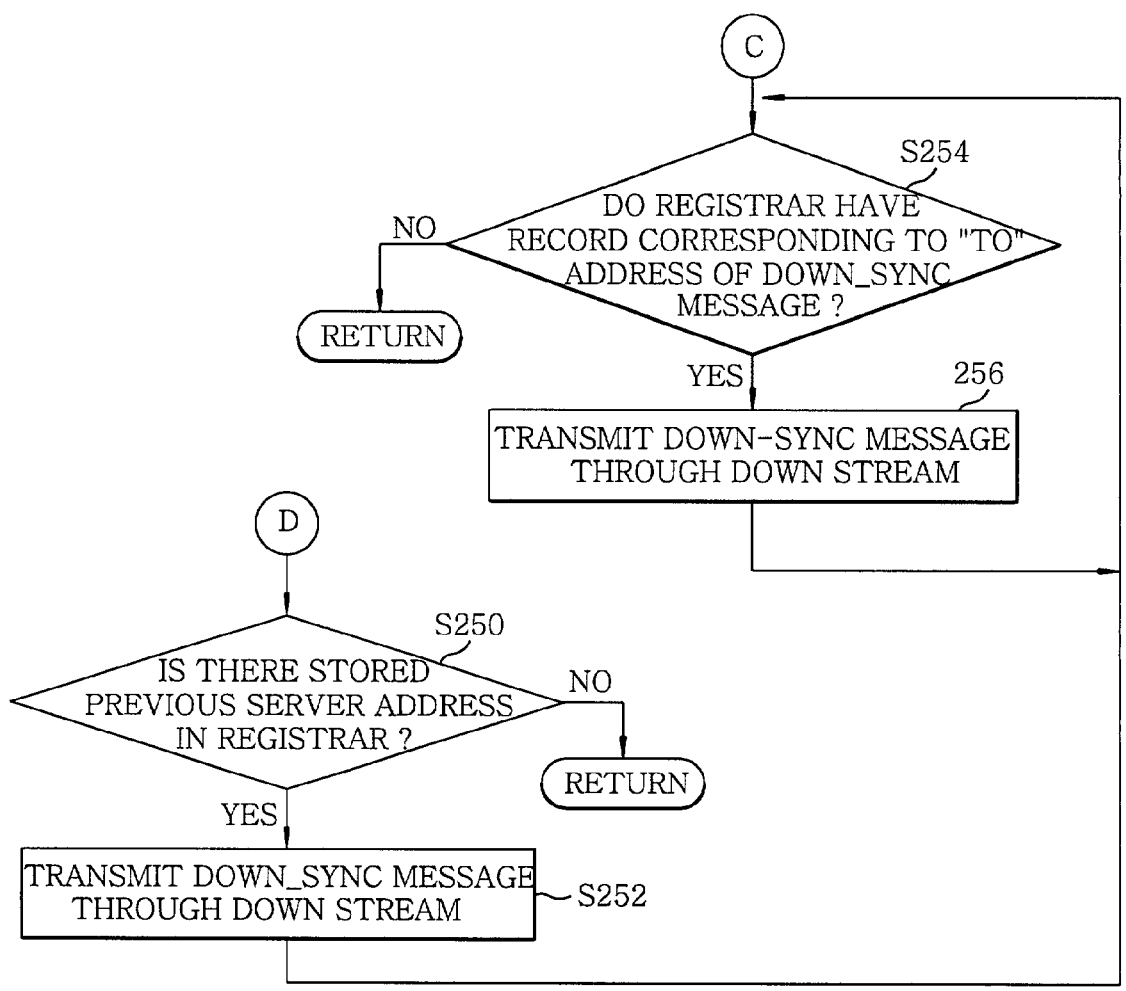

Thereafter, as depicted in FIG. 2C, the SIP server having received the up-sync message performs the following operation according to a record corresponding to the "To" address of the up-sync message.

First, at step S232, a "To" address of an up-sync message is compared with the "To" address of a registrar. If a record corresponding to the "To" address of the up-sync message is not found, the procedure proceeds to step S234, where a new record is created and the "To" address and a server address in the up-sync message are stored in the record.

As the result of the determination of the step S232, if a record corresponding to the "To" address of the up-sync message is found in the registrar, the procedure proceeds to step S236, where it is determined whether a contact address in the registrar is identical to a server address in the up-sync message. If the contact address in the registrar is identical to the contact address in the up-sync message, no operation is carried out.

As the result of the determination of the step S236, if a record corresponding to the "To" address of the up-sync message is found in the registrar but a contact address in the registrar is not identical to a server address in the up-sync message, the procedure proceeds to step S238, where the contact address in the registrar is changed to the server address in the up-sync message.

Meanwhile, at step S240, it is determined whether a record corresponding to the "To" address of the up-sync message has been changed or created. If the record is created, the procedure proceeds to step S242, where it is determined whether an upper SIP address and a registrar are present. If the upper SIP address and the registrar are present, the procedure proceeds to step S244, where an up-sync message is transmitted upstream to request the addition of newly created information or the change of information to the latest information.

If the record corresponding to the "To" address of the up-sync message has been changed, the procedure proceeds to steps S246 and 250.

At step S246, it is determined whether an upper SIP address and a registrar are present. If the upper SIP address and the registrar are present, the procedure proceeds to step S248, where an up-sync message is transmitted upstream to request the addition of newly created information or the change of information to the latest information.

Additionally, at step S250, it is determined whether the address of a previous server is present. If the address of the previous server is present, the procedure proceeds to step S252, where a down-sync message is transmitted downstream to the address of the previous server to request the deletion of information due to the change of previous information.

On the other hand, the SIP server having received the down-sync message performs the following operation.

First, at step S254, it is determined whether a record corresponding to a "To" address of the down-sync message is present in a registrar. If the record is present, the processor proceeds to step S256, where a down-sync message is transmitted downstream to request the deletion of information due to the change of previous information.

At the step S256, the deletion of information due to the change of previous information is requested by transmitting the down-sync message to the contact address of the record corresponding to the "To" address of the up-sync message. The downstream down-sync change downstream is carried out up to a registrar having a corresponding "To" address in a path reaching a leaf node corresponding to the UA.

Additionally, the upstream transmission of the up-sync message is carried out up to a SIP server/registrar corresponding to the root node granting the representative SIP address of the user, or up to a registrar having a corresponding "To" address in a path reaching a root node. The downstream down-sync change is carried out up to a registrar having a corresponding "To" address in the path reaching a leaf node corresponding to the UA.

Hereinafter, the method for synchronizing registration information in an inter-domain in accordance with the present invention are described for an illustrative purpose with reference to FIGS. 3A to 6C.

Figure 3A:
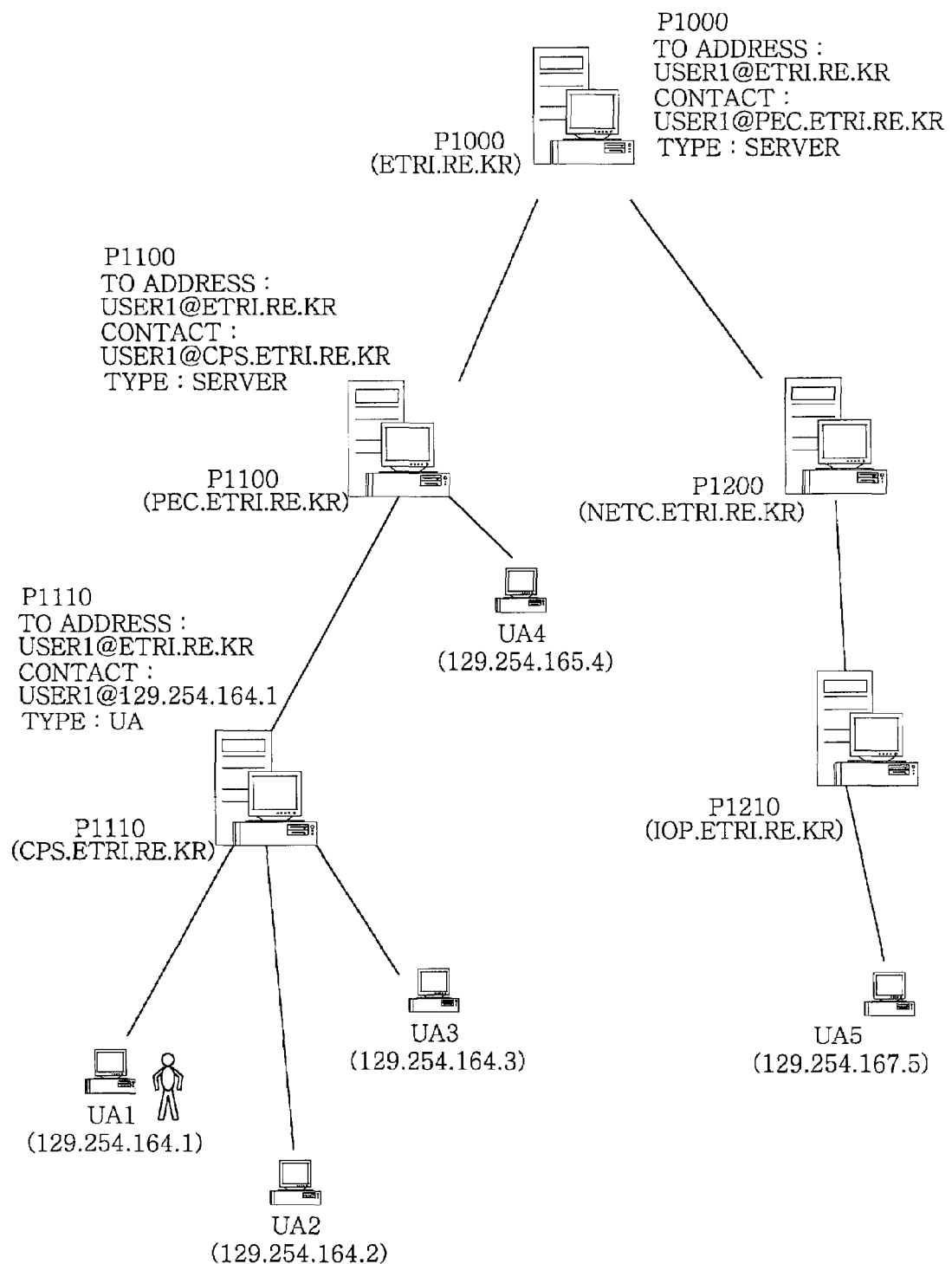
FIGS. 3A and 3B are views for explaining a procedure of synchronizing registration information in an intra-domain according to an embodiment of the present invention, showing information held by ISP servers and a message transmission process when a user is present at a UA1.
Figure 3B:
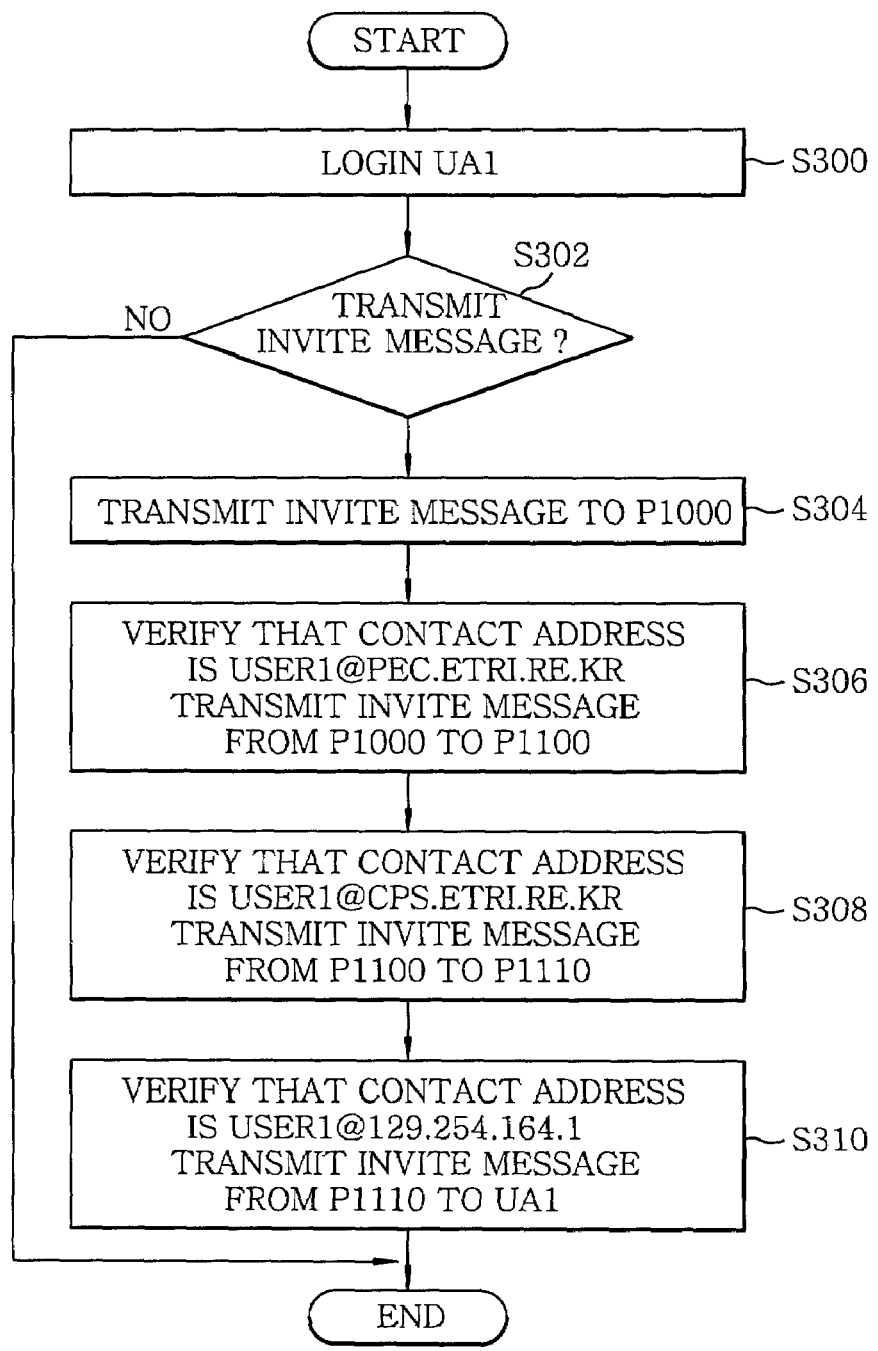

FIGS. 3A and 3B are views for explaining a procedure of synchronizing registration information in an intra-domain in accordance with an embodiment of the present invention, showing information held by ISP servers and a message transmission process when a user is present at the UA1.

Referring to FIG. 3A, the address information of each SIP server and each registrar may be described as an example as follows:

P1000: representative SIP server/registrar (domain name: etri.re.kr)

P1100: lower SIP server/registrar in P1000 (domain name: pec.etri.re.kr)

P1110: lower SIP server/registrar in P1100 (domain name: cps.etri.re.kr)

UA1, UA2 and UA3: lower UAs in P1110 (IP addresses: 129.254.164.1, 129.254.164.2, and 129.254.164.3)

UA4: lower UA in P1100 (IP address: 129.254.165.4)

P1200: lower SIP server/registrar in P1000 (domain name: netc.etri.re.kr)

P1210: lower SIP server/registrar in P1200 (domain name: iop.etri.re.kr)

UA5: lower UA in P1210 (IP address: 129.254.167.5)

In the meantime, when a user, who is given a SIP address, e.g., user1@etri.re.kr in the domain of the representative SIP server/registrar P1000, is present in the UA1 (S300), information held by the SIP servers/registrars is described as an example as follows:

P1000: "To" address; user1@etri.re.kr contact address; user1@pec.etri.re.kr type; server P1100: "To" address; user1@etri.re.kr contact address; user1@pec.etri.re.kr type; server P1110: "To" address; user1@etri.re.kr contact address; user@129.254.164.1 type; UA In this case, if a user having a SIP address user2@kt.co.kr in an exterior domain transmits an invite message to user1@etri.re.kr (S302), this invite message is transmitted along the following passage.

The invite message is transmitted to P1000 at etri.re.kr (S304).

The P1000 finds at its own registrar that the contact address of user1@etri.re.kr is user1@pec.etri.re.kr, and transmits the invite message to the P1100 at pec.etri.re.kr (S306).

The P1100 finds that the contact address of user1@etri.re.kr is user1@cps.etri.re.kr, and transmits the invite message to the P1110 at cps.etri.re.kr (S308).

The P1110 finds that the contact address of user1@etri.re.kr is user1@129.254.164.1, and transmits the invite message to the UA1 at 129.254.164.1 (S310).

Therefore, a user at the UA1 can find the invite message transmitted from the user2@kt.co.kr.

Figure 4A:
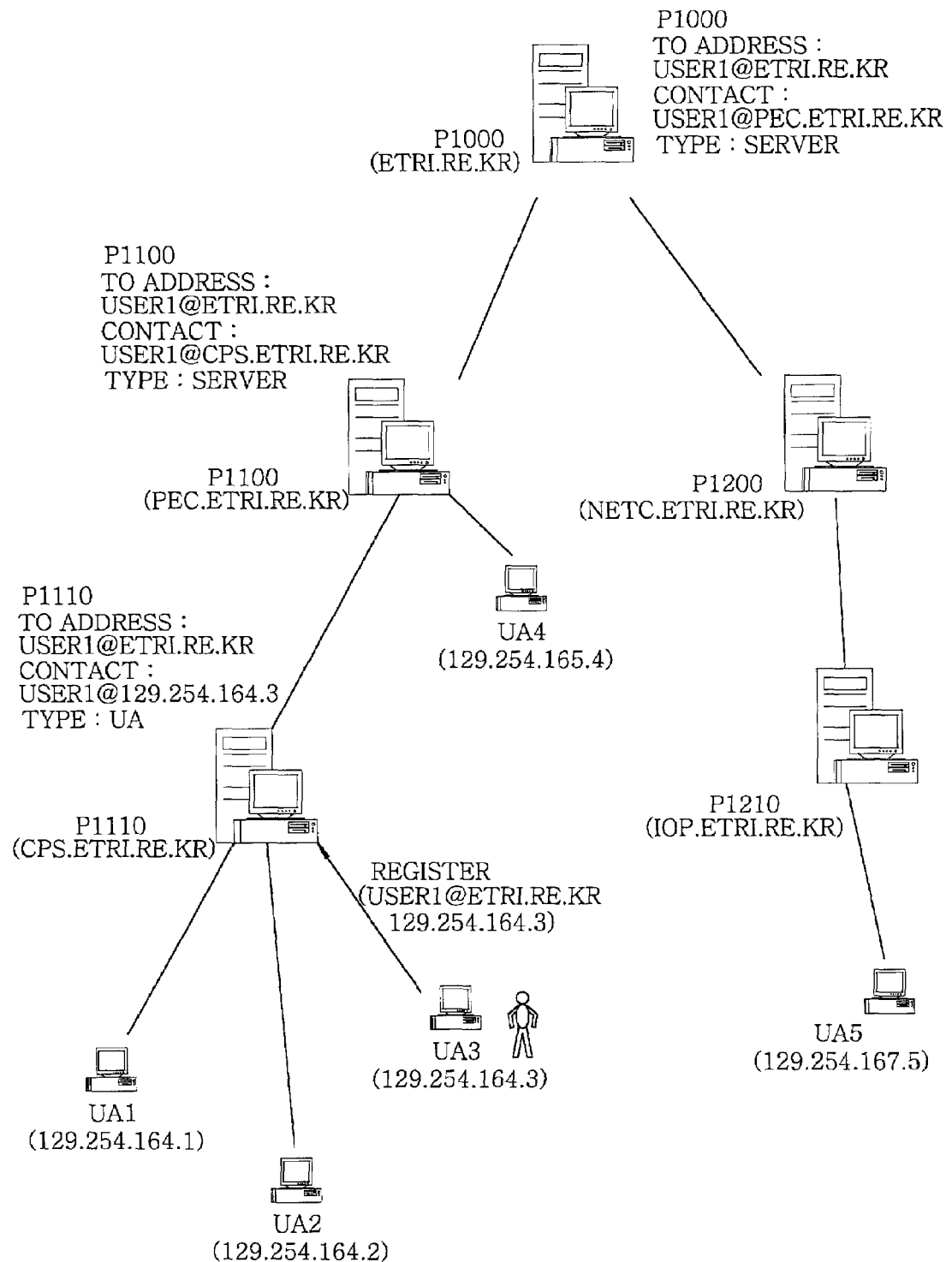
FIGS. 4A and 4B are views for explaining a procedure of synchronizing registration information in an intra-domain according to another embodiment of the present invention, showing information held by ISP servers and a message transmission process when a user moves from the UA1 to a UA3.
Figure 4B:
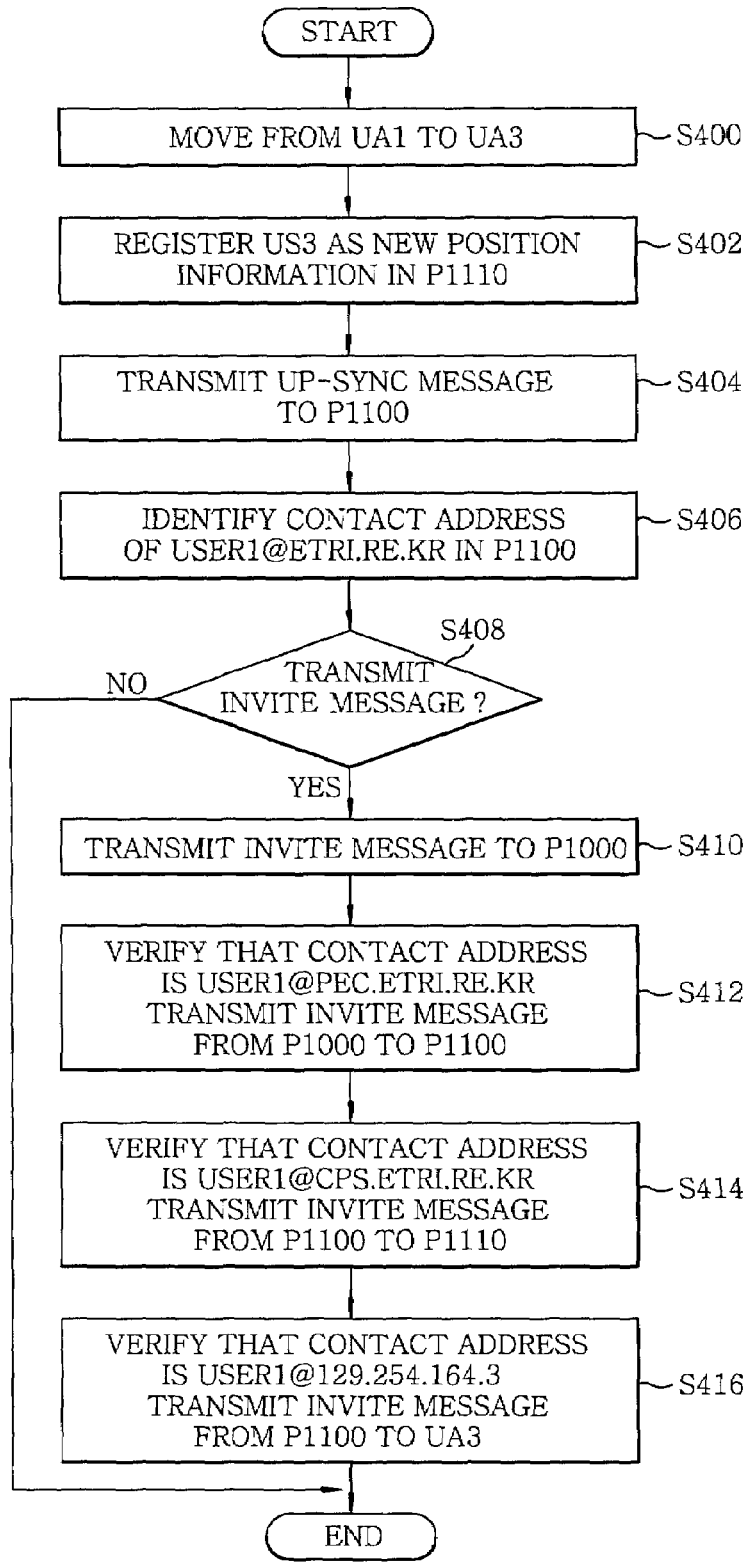

FIGS. 4A and 4B are views for explaining a procedure of synchronizing registration information in an intra-domain in accordance with another embodiment of the present invention, showing information held by ISP servers and a message transmission process when a user moves from the UA1 to the UA3.

First, when the user 1 of the UA1 moves to and logs in the UA3 (S400), the user 1 registers the UA3 as new position information in the upper SIP server/registrar P1110 managing the UA3, through a register message (S402).

The P1110 finds that the contact address of the user1@etri.re.kr is changed from the user1@129.254.164.1 to the user1@129.254.164.3, and transmits an up-sync message to the upper SIP server/registrar P1100. In this case, the type of the user1@129.254.164.1 is not a server but a UA, so a down-sync message is not transmitted.

Thereafter, registrar information is changed from the user1@129.254.164.1 to the user1@129.254.164.3.

The P1100 having received the up-sync message finds that the contact address of the user1@etri.re.kr is not changed from the user1@cps.etri.re.kr, and no further operation is carried out (S406).

In the meantime, as shown in FIG. 4A, when a user, who is given a SIP address, e.g., user1@etri.re.kr, in the domain etri.re.kr, is present in the UA3, information held by the SIP servers/registrars is described as an example as follows:

P1000: "To" address; user1@etri.re.kr contact address; user1@pec.etri.re.kr type; server P1100: "To" address; user1@etri.re.kr contact address; user1@pec.etri.re.kr type; server P1110: "To" address; user1@etri.re.kr contact address; user1@129.254.164.3 type; UA In this case, if a user having a SIP address user3@dacom.co.kr in an exterior domain transmits an invite message to user1@etri.re.kr (S408), this invite message is transmitted along the following passage.

First of all, the invite message is transmitted to P1000 at etri.re.kr (S410).

The P1000 finds at its own registrar that the contact address of user1@etri.re.kr is user1@pec.etri.re.kr, and transmits the invite message to the P1100 at pec.etri.re.kr (S412).

The P1100 finds that the contact address of user1@etri.re.kr is user1@cps.etri.re.kr, and transmits the invite message to the P1110 at cps.etri.re.kr (S414).

The P1110 finds that the contact address of user1@etri.re.kr is user1@129.254.164.3, and transmits the invite message to the UA3 at 129.254.164.3 (S416).

Therefore, a user at the UA3 can find the invite message transmitted from the user3@dacom.co.kr.

Figure 5A:
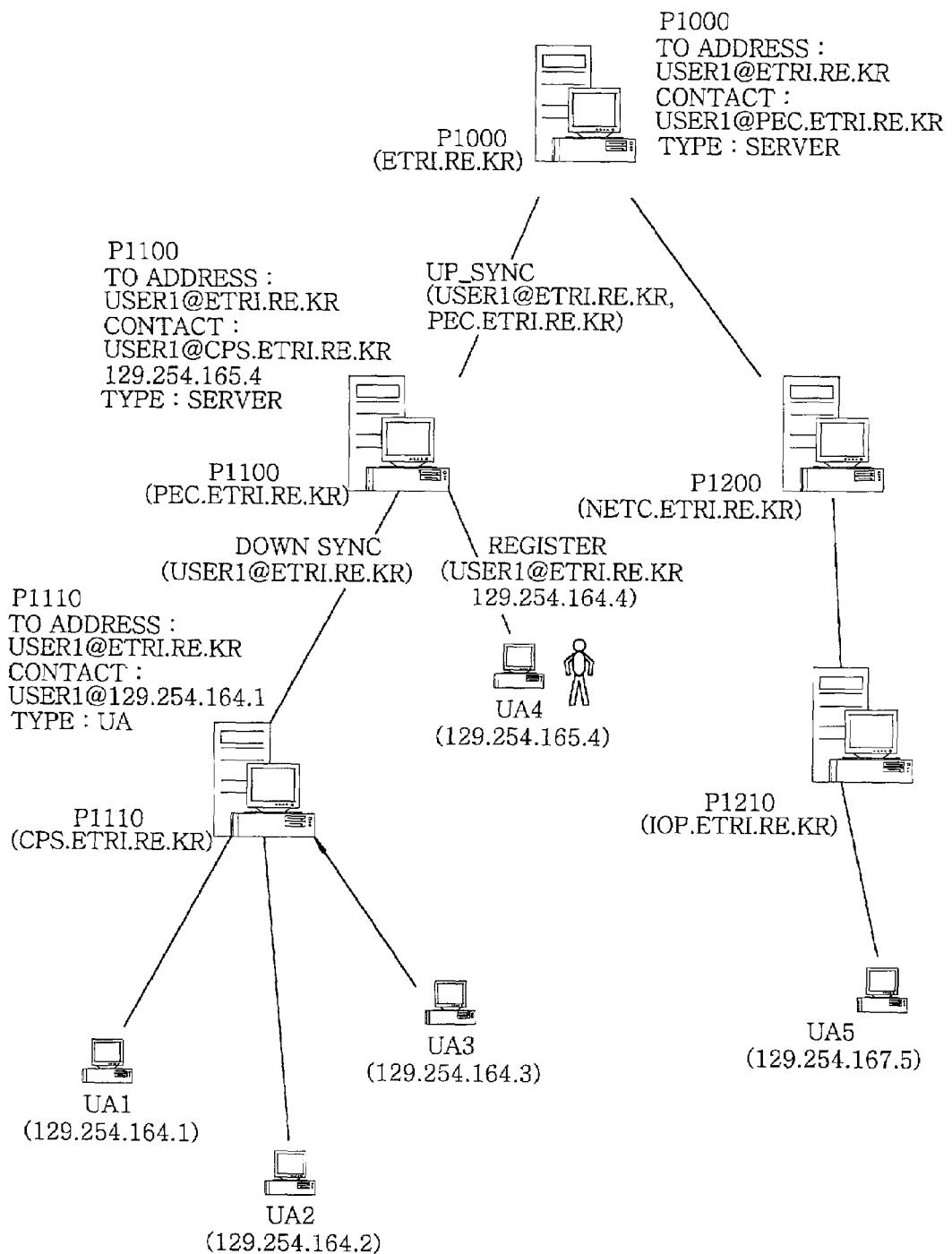
FIGS. 5A and 5B are views for explaining a procedure of synchronizing registration information in an intra-domain according to still another embodiment of the present invention, showing information held by ISP servers and a message transmission process when a user moves from the UA1 to a UA4.
Figure 5B:
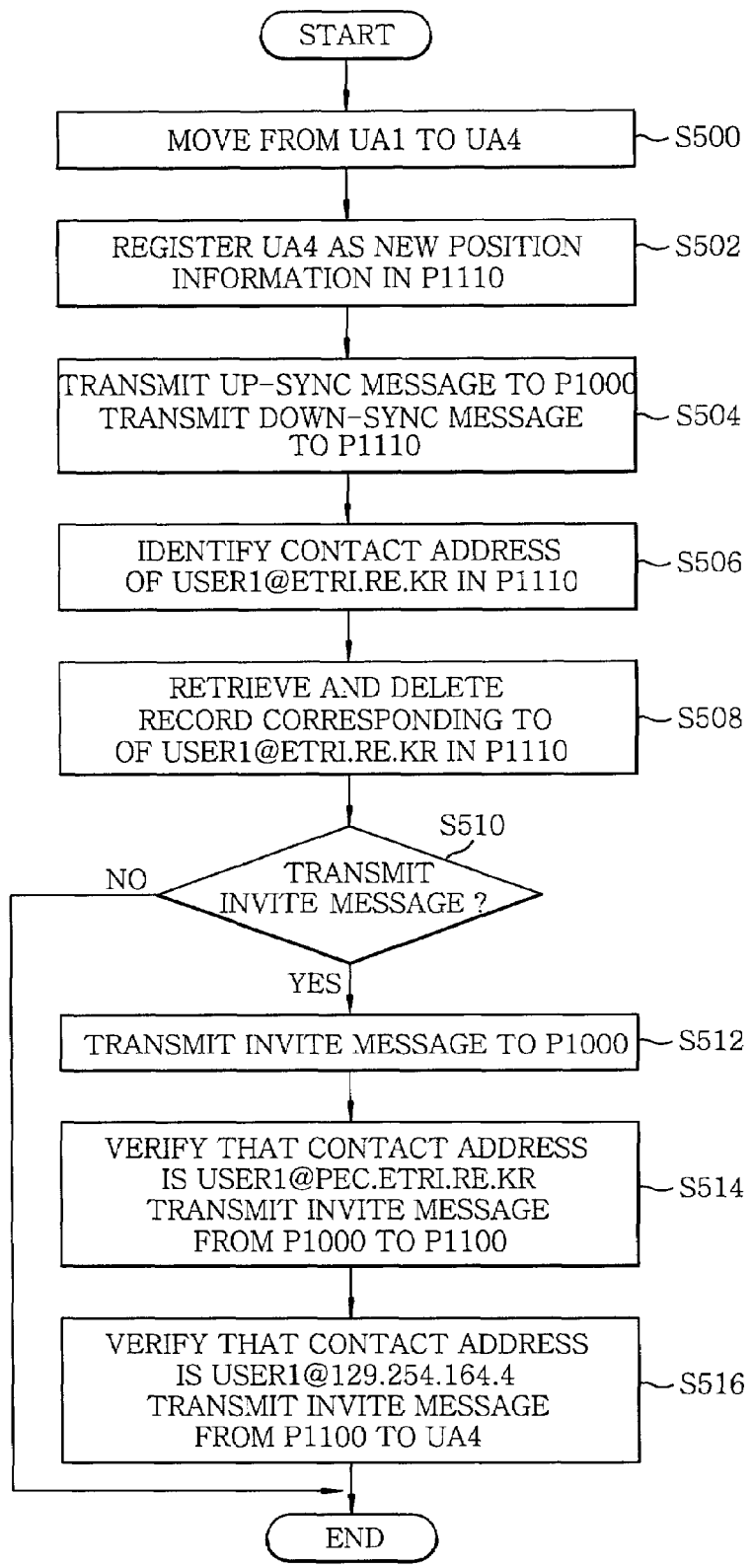

FIGS. 5A and 5B are views for explaining a procedure of synchronizing registration information in an intra-domain in accordance with still another embodiment of the present invention, showing information held by ISP servers and a message transmission process when a user moves from the UA1 to the UA4.

First, when a user 1 of the UA1 moves to and logs in UA4 (S500), the user 1 registers the UA3 as new position information in the upper SIP server/registrar P1100 managing the UA4, through a register message (S502).

The P1100 finds that the contact address of the user1@etri.re.kr is changed from the user1@cps.etri.re.kr to user1@129.254.165.4, and transmits an up-sync message to the upper SIP server/registrar P1000. Additionally, the type of the user1@cps.etri.re.kr is a server, so a down-sync message is not transmitted (S504). Thereafter, registrar information is changed from the user1@cps.etri.re.kr to the user1@129.254.165.4.

The P1000 having received the up-sync message finds that the contact address of the user1@etri.re.kr is not changed from the user1@pec.etri.re.kr, and no further operation is carried out (S506).

The P1110 having received the down-sync message searches for a record corresponding to the user1@etri.re.kr (contact address: user1@129.254.164.1, type: UA). The type of user1@129.254.164.1 is a UA, so no further operation is carried out and a corresponding record is deleted (S508).

In the meantime, as shown in FIG. 5A, when a user, who is given a SIP address, e.g., user1@etri.re.kr, in the domain etri.re.kr, is present in the UA4, information held by the SIP servers/registrars is described as an example as follows:

P1000: "To" address; user1@etri.re.kr contact address; user1@pec.etri.re.kr type; server P1100: "To" address; user1@etri.re.kr contact address; user1@129.254.164.4 type; UA In this case, if a user having a SIP address user3@dacom.co.kr in an exterior domain transmits an invite message to user1@etri.re.kr (S510), this invite message is transmitted along the following passage.

First of all, the invite message is transmitted to P1000 at etri.re.kr (S512).

The P1000 finds at its own registrar that the contact address of user1@etri.re.kr is user1@pec.etri.re.kr, and transmits the invite message to the P1100 at pec.etri.re.kr (S514)

The P1100 finds that the contact address of user1@etri.re.kr is user1@129.254.164.4, and transmits the invite message to the UA4 at 129.254.164.4 (S516).

Therefore, a user at the UA4 can find the invite message transmitted from the user3@dacom.co.kr.

Figure 6A:
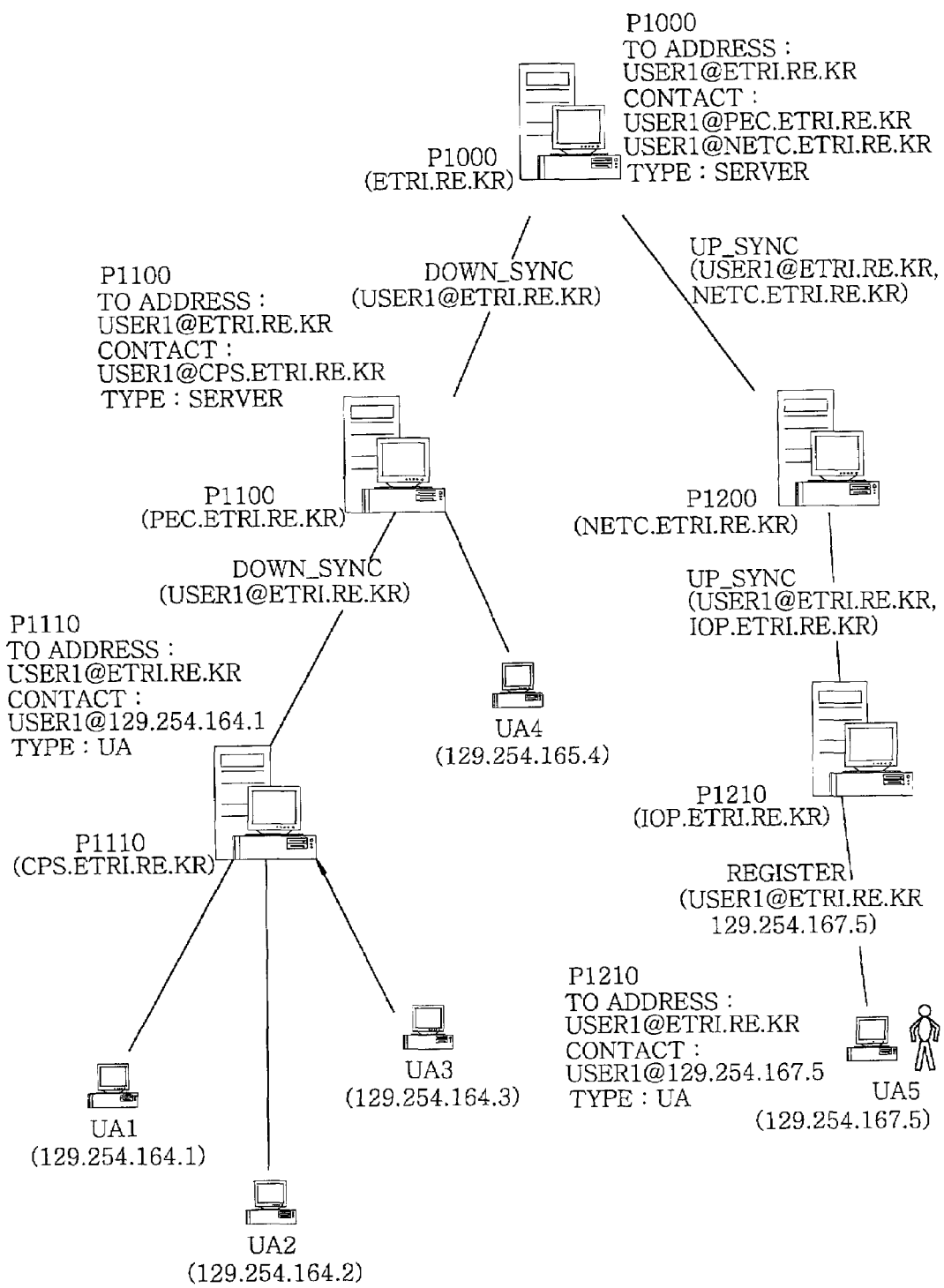
FIGS. 6A to 6C are views for explaining a procedure of synchronizing registration information in an intra-domain according to an additional embodiment of the present invention, showing information held by ISP servers and a message transmission process when a user moves from the UA1 to a UA5.
Figure 6B:
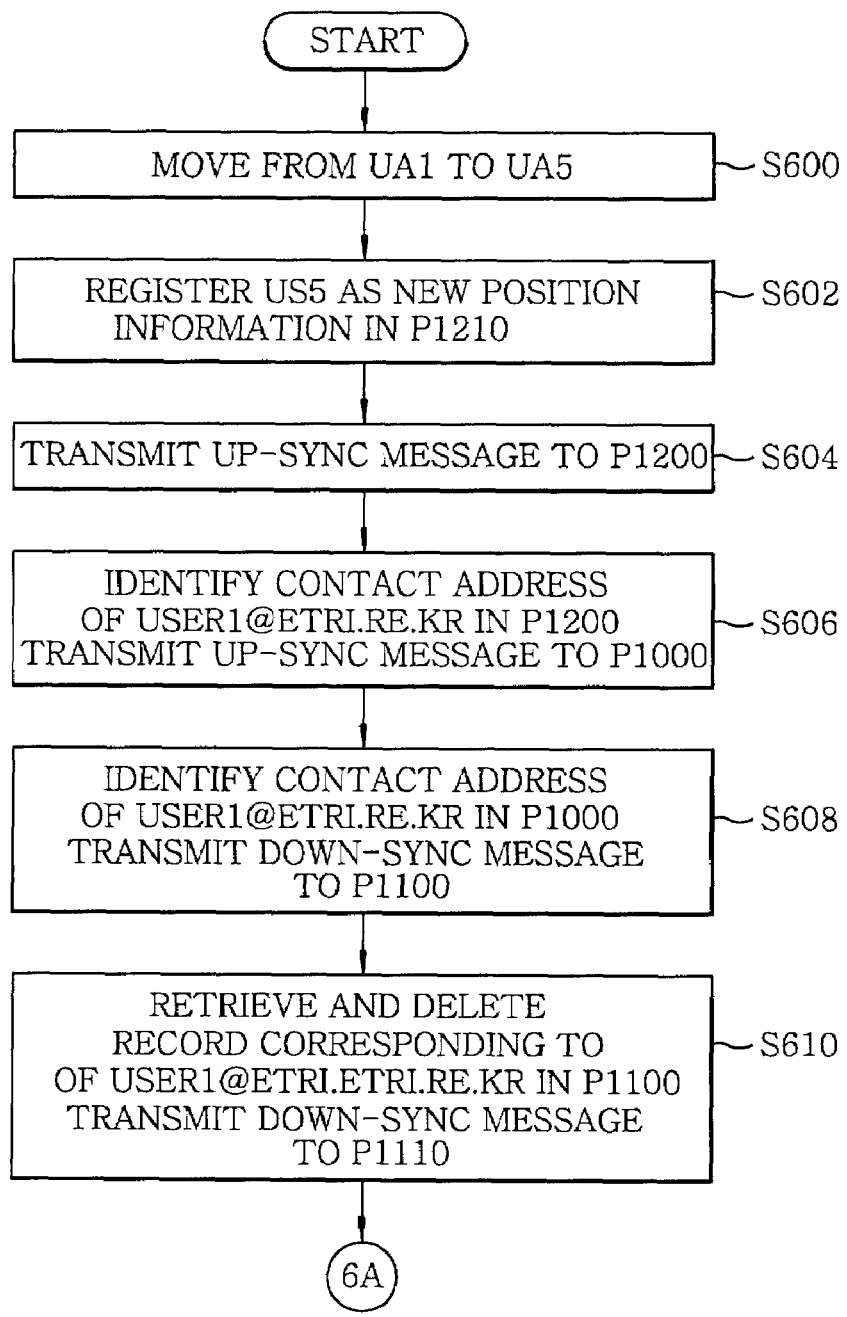
Figure 6C:
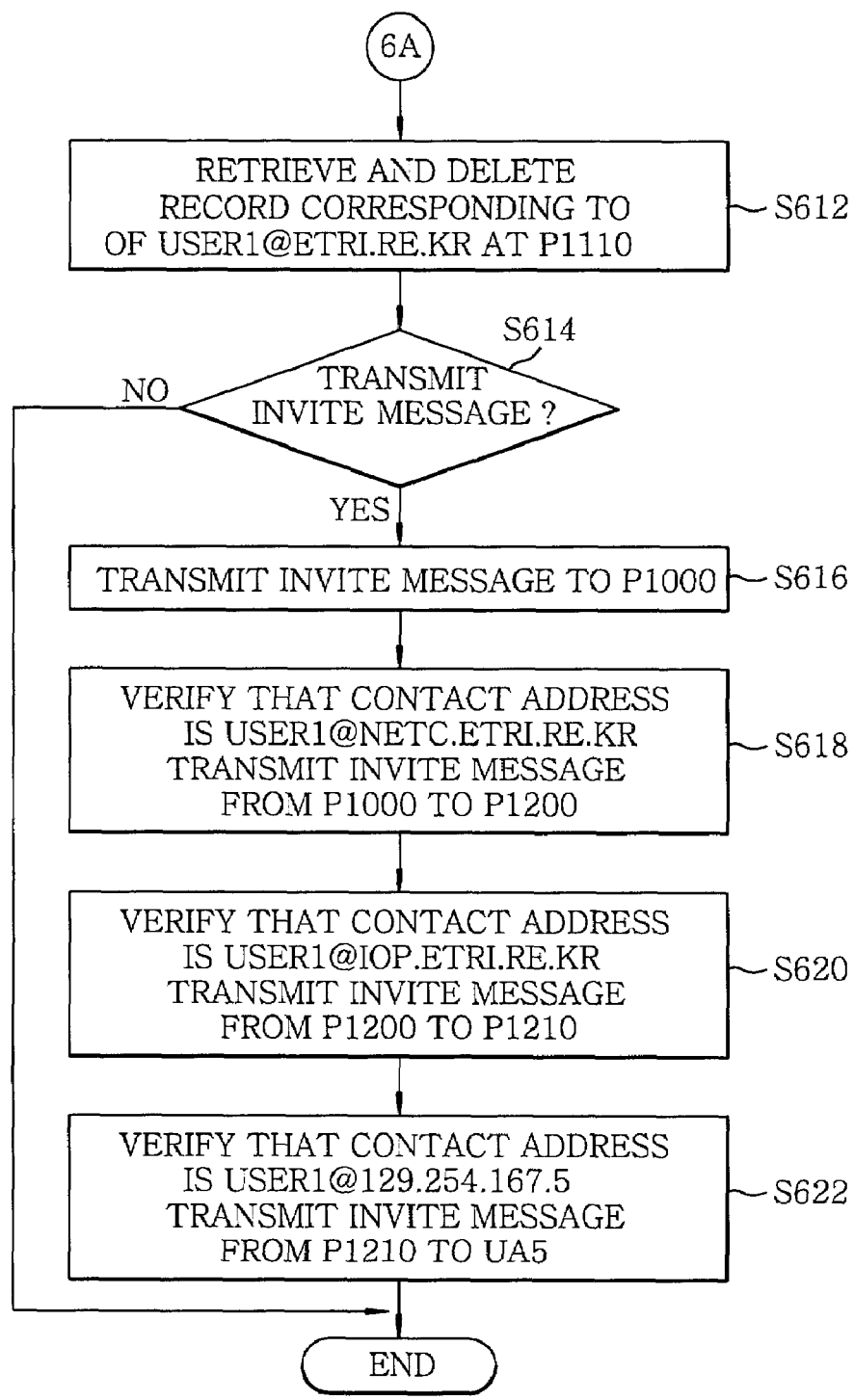

FIGS. 6A to 6C are views for explaining a procedure of synchronizing registration information in an intra-domain in accordance with an additional embodiment of the present invention, showing information held by ISP servers and a message transmission process when a user moves from the UA1 to the UA5.

First, when a user 1 of the UA1 moves to and logs in UA5 (S600), the user 1 registers the UA5 as new position information in the upper SIP server/registrar P1210 managing the UA5, through a register message (S602).

The P1100 finds that the contact address of the user1@etri.re.kr is created as user1@129.254.167.5, transmits an up-sync message to the upper SIP server/registrar P1200, and creates a corresponding record in its registrar (S604).

The P1210 having received the up-sync message finds that the contact address of the user1@etri.re.kr is created as user1@iop.etri.re.kr, transmits an up-sync message to the upper SIP server/registrar P1000, and creates a corresponding record in its registrar (S606).

The P1000 having received the up-sync message finds that the contact address of the user1@etri.re.kr is changed from the user1@pec.etri.re.kr to the user1@netc.etri.re.kr, and does not create a down-sync message because an upper SIP server/registrar is not present. Additionally, a down-sync message is transmitted because the type of user1@pec.etri.re.kr is a server (S608). Thereafter, registrar information is changed from the user1@pec.etri.re.kr to user1@netc.etri.re.kr.

The P1100 having received the down-sync message searches for a record corresponding to the user1@etri.re.kr (contact address: user1@cps.etri.re.kr, type: server). The down-sync message is transmitted because the type of user1@cps.etri.re.kr is a server. Thereafter, a corresponding record is deleted (S610).

The P1110 having received the down-sync message searches for a record corresponding to the user1@etri.re.kr (contact address: user1@129.254.164.1, type: UA). The type of user1@129.254.164.1 is a UA, so no further operation is carried out and a corresponding record is deleted (S612).

In the meantime, as shown in FIG. 6A, when a user, who is given a SIP address, e.g., user1@etri.re.kr, in the domain etri.re.kr, is present in the UA5, information held by the SIP servers/registrars is described as an example as follows:

P1000: "To" address; user1@etri.re.kr contact address; user1@netc.etri.re.kr P1200: "To" address; user1@etri.re.kr contact address; user1@iop.etri.re.kr P1210: "To" address; user1@etri.re.kr contact address; user1@129.254.167.5

In this case, if a user having a SIP address user4@kt.co.kr in an exterior domain transmits an invite message to user1@etri.re.kr (S614), this invite message is transmitted along the following passage.

First of all, the invite message is transmitted to P1000 at etri.re.kr (S616).

The P1000 finds at its own registrar that the contact address of user1@etri.re.kr is user1@netc.etri.re.kr, and transmits the invite message to the P1200 at netc.etri.re.kr (S618).

The P1200 finds that the contact address of user1@etri.re.kr is user1@iop.etri.re.kr, and transmits the invite message to the P1210 at netc.etri.re.kr (S620).

The P1210 finds that the contact address of user1@etri.re.kr is user1@129.254.167.5, and transmits the invite message to the UA5 at 129.254.167.5 (S622).

Therefore, a user at the UA5 can find the invite message transmitted from the user4@kt.co.kr.

As described above, the present invention provides a method for synchronizing registration information in an intra-domain, which allows the current position of a user to be easily found even though current user position information according to SIP addresses used to distinguish one user from another in a domain is stored in registrars included in SIP servers without being stored in a central server, and prevents the concentration of load on a server to increase the processing speed of a system in such a way that a large number of users are distributed but are not managed by the central server, thereby overcoming a shortcoming of current SIP standards that accurate position information is not provided.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method for synchronizing user registration information in an interdomain having User Agents (UAs) corresponding to leaf nodes of a tree structure and functioning as entities for substituting for users, and Session Initiation Protocol (SIP) servers/registrars corresponding to a root node or intermediate nodes of the tree structure, comprising the steps of:

registering current position information of a random user through a register message when the user moves from one User Agent (UA) to another;

transmitting a up-sync message upstream of a tree structure and a down-sync message downstream of the tree structure when user registration information is created or changed;

performing synchronization of the user registration information in upper and lower SIP servers/registrars having received the up-sync and down-sync messages, respectively.

changing registrar information whenever a random user registers his current position information through a register message;

comparing a "To" address of the register message with a "To" address of a registrar in a random SIP server having received the register message;

if a record corresponding to the "To" address of the register message is not present in the registrar, creating a new record and storing the "To" address and the contact address of the register message in the record;

if the record corresponding to the "To" address of the register message is present in the registrar and the contact address of the registrar is not identical to the contact address of the register message, changing the contact address of the registrar into the contact address of the register message;

if the record corresponding to the "To" address of the is register message has been created or changed, determining whether register is requested from the same domain, and determining whether the record corresponding to the "To" address of the register message has been created or changed if register is requested from the same domain;

if the record corresponding to the "To" address of the register message has been created or changed, determining whether an upper SIP address and an upper registrar are present, and requesting addition of newly created information or the change of information to the latest information by transmitting the up-sync message upstream if the upper SIP address and the upper registrar are present; and if the record corresponding to the "To" address of the register message has been changed, determining whether a lower SIP address and a lower registrar are present and their type is a server, and requesting deletion of information due to the change of previous information by transmitting the up-sync message upstream if the lower SIP address and the lower registrar are present and their type is a server.

2. The method according to claim 1, wherein said addition and change step comprises the steps of:

comparing the "To" address of the up-sync message with the "To" address of the registrar, and creating a new record and storing the "To" address and a server address of the up-sync message in the new record, if a record corresponding to the "To" address of the up-sync message is not present;

changing the contact address of the registrar to the server address of the up-sync message if the record corresponding to the "To" address of the up-sync message is present and the contact address of the registrar is not identical to the server address of the up-sync message;

determining whether the record corresponding to the "To" address of the up-sync message has been changed or created;

if the record corresponding to the "To" address of the up-sync message has been created, determining whether an upper SIP address and an upper registrar are present, and requesting addition of newly created information or the change of information to the latest information by transmitting the up-sync message upstream if the upper SIP address and the upper registrar are present;

if the record corresponding to the "To" address of the up-sync message has been changed, determining whether the upper SIP address and the upper registrar are present, and requesting addition of newly created information by transmitting the up-sync message upstream if the upper SIP address and the upper registrar are present; and determining whether a previous server address is present, and requesting deletion of information due to the change of previous information by transmitting the down-sync message to an address of the previous server stored in the registrar if a previous server is present.

3. The method according to claim 2, wherein said upstream transmission of the up-sync message is carried out up to a SIP server/registrar corresponding to the root node granting a representative SIP address of a user, or up to a registrar having a corresponding "To" address in a path reaching the root node, and said downstream down-sync change is carried out up to a registrar having a corresponding "To" address in a path reaching a leaf node corresponding to the UA.

4. A system for synchronizing user registration information in an inter domain comprising:

User Agents (UAs) corresponding to leaf nodes of a tree structure and functioning as entities for substituting for users, Session Initiation Protocol (SIP) servers/registrars corresponding to a root node or intermediate nodes of the tree structure;

a registration device for registering current position information of a random user through a register message when the user moves from one User Agent (UA) to another;

a transmitting device for transmitting a up-sync message upstream of a tree structure and a down-sync message downstream of the tree structure when user registration information is created or changed; and a synchronization device for performing synchronization of the user registration information in upper and lower SIP servers/registrars having received the up-sync and down sync messages, respectively;

means for changing registrar information whenever a random user registers his current position information through a register message;

means for comparing a "To" address of the register message with a "To" address of a registrar in a random SIP server having received the register message;

means for creating a new record and storing the "To" address and the contact address of the register message in the record, if a record corresponding to the "To" address of the register message is not present in the registrar;

means for changing the contact address of the registrar into the contact address of the register message, if the record corresponding to the "To" address of the register message is present in the registrar and the contact address of the registrar is not identical to the contact address of the register message;

means for determining whether register is requested from the same domain, and determining whether the record corresponding to the "To" address of the register message has been created or chanced if register is requested from the same domain, if the record corresponding to the "To" address of the is register message has been created or changed;

means for determining whether an upper SIP address and an upper registrar are present, and means for requesting addition of newly created information or the change of information to the latest information by transmitting the up-sync message upstream if the upper SIP address and the upper registrar are present, if the record corresponding to the "To" address of the register message has been created or changed; and means for determining whether a lower SIP address and a lower registrar are present and their type is a server, and requesting deletion of information due to the change of previous information by transmitting the up-sync message upstream if the lower SIP address and the lower registrar are present and their type is a server, if the record corresponding to the "To" address of the register message has been changed.

5. The system according to claim 4, wherein said means for requesting addition and means for changing further comprise:

means for comparing the "To" address of the up-sync message with the "To" address of the registrar, and creating a new record and storing the "To" address and a server address of the up-sync message in the new record, if a record corresponding to the "To" address of the up-sync message is not present;

means for changing the contact address of the registrar to the server address of the up-sync message if the record corresponding to the "To" address of the up-sync message is present and the contact address of the registrar is not identical to the server address of the up-sync message;

means for determining whether the record corresponding to the "To" address of the up-sync message has been changed or created;

means for determining whether an upper SIP address and an upper registrar are present, and requesting addition of newly created information or the change of information to the latest information by transmitting the up-sync message upstream if the upper SIP address and the upper registrar are present, if the record corresponding to the "To" address of the up-sync message has been created;

means for determining whether the upper SIP address and the upper registrar are present, and requesting addition of newly created information by transmitting the up-sync message upstream if the upper SIP address and the upper registrar are present, if the record corresponding to the "To" address of the up-sync message has been changed; and means for determining whether a previous server address is present, and requesting deletion of information due to the change of previous information by transmitting the downsync message to an address of the previous server stored in the registrar if a previous server is present.

6. The system according to claim 4, wherein said upstream transmission of the up-sync message is carried out up to a SIP server registrar corresponding to the root node granting a representative SIP address of a user, or up to a registrar having a corresponding "To" address in a path reaching the root node, and said downstream downsync change is carried out up to a registrar having a corresponding "To" address in a path reaching a leaf node corresponding to the UA.

7. A computer readable medium storing thereon computer readable instructions for performing a method for synchronizing user registration information in an inter-domain having User Agents (UAs) corresponding to leaf nodes of a tree structure and functioning as entities for substituting for users, and Session Initiation Protocol (SIP) servers/registrars corresponding to a root node or intermediate nodes of the tree structure, comprising the steps of:
  registering current position information of a random user through a register message when the user moves from one User Agent (UA) to another;
  transmitting a up-sync message upstream of a tree structure and a down-sync message downstream of the tree structure when user registration information is created or changed; and performing synchronization of the user registration information in upper and lower SIP serve registrars having received the up-sync and down-sync messages, respectively;
  changing registrar information whenever a random user registers his current position information through a register message;
  comparing a "To" address of the register message with a "To" address of a registrar in a random SIP server having receiving the register message;
  if a record corresponding to the "To" address of the register message is not present in the registrar, creating a new record and storing the "To" address and the contact address of the register message in the record;
  if the record corresponding to the "To" address of the register message is present in the registrar and the contact address of the registrar is not identical to the contact address of the register message, changing the contact address of the registrar into the contact address of the register message;
  if the record corresponding to the "To" address of the is register message has been created or changed, determining whether register is requested from the same domain, and determining whether the record corresponding to the "To" address of the register message has been created or changed if register is requested from the same domain;
  if the record corresponding to the "To" address of the register message has been created or changed, determining whether an upper SIP address and an upper registrar are present, and requesting addition of newly created information or the change of information to the latest information by transmitting the up-sync message upstream if the upper SIP address and the upper registrar are present; and if the record corresponding to the "To" address of the register message has been changed, determining whether a lower SIP address and a lower registrar are present and their type is a server, and requesting deletion of information due to the chance of previous information by transmitting the up-sync message upstream if the lower SIP address and the lower registrar are present and their type is a server.

8. The computer readable medium according to claim 7, wherein said addition and change step comprises the steps of: comparing the "To" address of the up-sync message with the "To" address of the registrar, and creating a new record and storing the "To" address and a server address of the up-sync message in the new record, if a record corresponding to the "To" address of the up-sync message is not present; changing the contact address of the registrar to the server address of the up-sync message if the record corresponding to the "To" address of the up-sync message is present and the contact address of the registrar is not identical to the server address of the up-sync message; determining whether the record corresponding to the "To" address of the up-sync message has been changed or created; if the record corresponding to the "To" address of the up-sync message has been created, determining whether an upper SIP address and an upper registrar are present, and requesting addition of newly created information or the change of information to the latest information by transmitting the up-sync message upstream if the upper SIP address and the upper registrar are present; if the record corresponding to the "To" address of the up-sync message has been changed, determining whether the upper SIP address and the upper registrar are present, and requesting addition of newly created information by transmitting the up-sync message upstream if the upper SIP address and the upper registrar are present; and determining whether a previous server address is present, and requesting deletion of information due to the change of previous information by transmitting the downsync message to an address of the previous server stored in the registrar if a previous server is present.

9. The computer readable medium according to claim 7, wherein said upstream transmission of the up-sync message is carried out up to a SIP server/registrar corresponding to the root node granting a representative SIP address of a user, or up to a registrar having a corresponding "To" address in a path reaching the root node, and said downstream downsync change is carried out up to a registrar having a corresponding "To" address in a path reaching a leaf node corresponding to the UA.

* * * * *